Oct. 10, 1933.  F. B. VOGDES  1,929,571
ELECTRIC POWER CONVERTING APPARATUS
Filed March 11, 1931
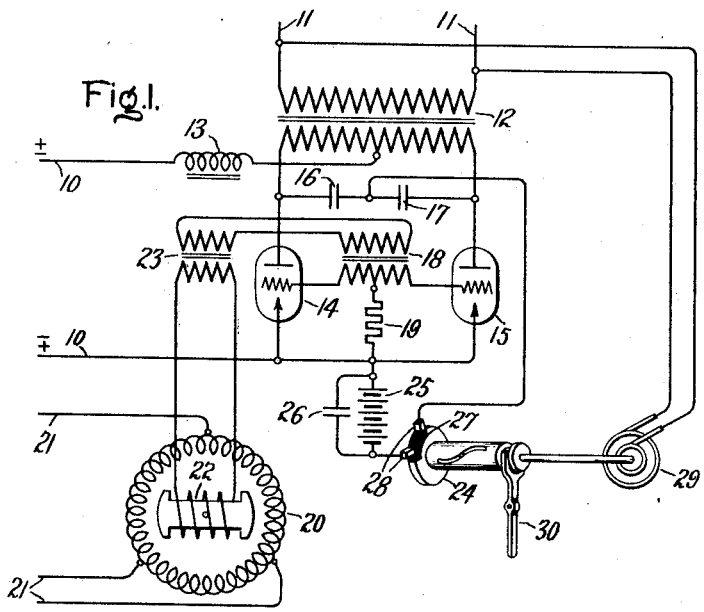
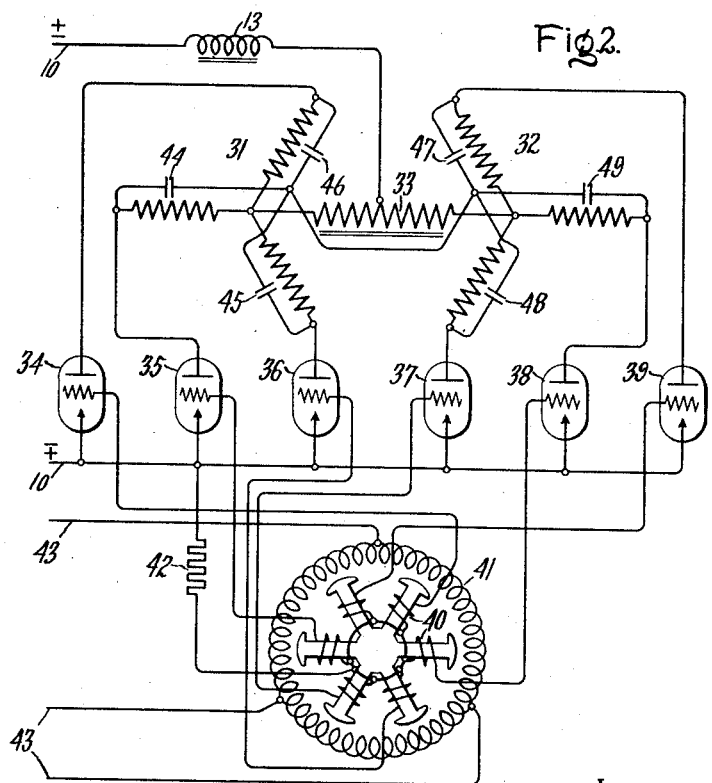
Inventor:
Francis B. Vogdes,
by Charles E. Tullar
His Attorney.

Patented Oct. 10, 1933

1,929,571

UNITED STATES PATENT OFFICE 1,929,571

ELECTRIC POWER CONVERTING APPARATUS

Francis B. Vogdes, White Plains, N. Y., assignor to General Electric Company, a corporation of New York Application March 11, 1931. Serial No. 521,800

17 Claims. (Cl. 175—363)

My invention relates to electric power converting apparatus and more particularly to such apparatus utilizing electric valves for transmitting energy between direct and alternating current circuits.

Heretofore there have been devised numerous arrangements including electric valves for transmitting energy between direct and alternating current circuits. These various apparatus of the prior art, however, have been subject to certain inherent limitations with respect to the control of the power factor of the alternating current circuit of the apparatus. For example, when transmitting energy from a direct current circuit to an alternating current circuit by apparatus of this kind, it has been impossible to supply a load having a lagging power factor without the use of an excessive amount of capacitance connected to the alternating current circuit to compensate for the lagging current drawn by the load. This limitation is due to the fact that it is not ordinarily possible to commutate the current from a path having a lower counter-electromotive force to a path having a higher counter-electromotive force, so that it has been necessary to transfer the load current from one path to the other while the counter-electromotive force of the path including the incoming valve is less than that from which the current is being commutated. Similarly in the transmission of energy from an alternating current circuit to a direct current circuit it often becomes desirable to control the voltage of the direct current circuit by retarding the phase of the grid potentials with respect to the anode potentials of the several electric valves, which, obviously, results in a lagging power factor on the alternating current circuit. Heretofore it has not been possible to commutate the load current from a valve having a higher anode potential to one having a lower anode potential. That is, it has not been possible to transfer the load current from a path having a higher electromotive force to one having a lower electromotive force, so that the load current of such an apparatus was always at least slightly lagging.

It is an object of my invention to provide an improved electric power converting apparatus including electric valves and a method of operating the same which will overcome the above-mentioned disadvantages of the arrangements of the prior art and which will be simple, economical and reliable in operation.

It is another object of my invention to provide an improved electric power converting apparatus including electric valves and a method of operating the same in which the alternating current circuit of the apparatus may be operated at any desired power factor.

It is a further object of my invention to provide an improved electric power converting apparatus including electric valves and a method of operating the same for transmitting energy from a direct current circuit to an alternating current circuit which is particularly suitable for supplying an alternating current load having a lagging power factor.

It is a still further object of my invention to provide an improved electric power converting apparatus including electric valves and a method of operating the same for transmitting energy from an alternating current circuit to a direct current circuit in which the voltage of the direct current circuit may be controlled as desired and in which the alternating current circuit will normally operate with a leading power factor.

In accordance with my invention a capacity network having a neutral point is connected between the circuits of the several electric valves, and means are provided for periodically shifting the potential of this neutral point of the capacity network in such a direction as to interrupt momentarily the current in all of the electric valves. Current will immediately restart only in those valves whose grid potential is above the critical value so that the commutation of current between the valves may be controlled by adjusting the phase relation of the grid potentials of the several valves with respect to the periodic shifting of the potential of the capacity network.

For a better understanding of my invention, together with other and further objects thereof, reference is had to the following description taken in connection with the accompanying drawing and its scope will be pointed out in the appended claims. Fig. 1 of the accompanying drawing represents an embodiment of my invention for transmitting energy in either direction between a direct current circuit and a single phase alternating current circuit, while Fig. 2 illustrates a modification of my invention particularly applicable to polyphase circuits.

Referring now to Fig. 1 of the drawing, I have illustrated an arrangement for transmitting energy between a direct current circuit 10 and an alternating current circuit 11. This apparatus includes a transformer having one winding connected to the alternating current circuit 11 and a second winding provided with an electrical midpoint connected to one side of the direct current circuit 10 through a reactor 13. The outer terminals of this latter winding are connected to the other side of the direct current circuit 10 through a pair of electric valves 14 and 15. The electric valves 14 and 15 are each provided with an anode, a cathode, and a control grid and may be of any of the several types well known in the art, but I prefer to use valves of the vapor electric discharge type because of the relatively large amounts of power which may be handled by them at ordinary operating voltages. Commutating capacitors 16 and 17 are connected in series between the anode circuits of the valves 14 and 15. The control grids of the valves 14 and 15 are connected to their common cathode circuit through opposite halves of the secondary winding of a grid transformer 18 and a current-limiting resistor 19. The primary winding of the grid transformer 18 may be energized from any of the several phase shifting arrangements well known in the art, but I have shown, by way of example, a rotary phase shifting transformer 20 energized from any suitable polyphase circuit 21 synchronized with the circuit 11, or supplied directly from the circuit 11 through any suitable phase splitting circuit. The transformer 20 is provided with a rotatable secondary member 22 from which the grid transformer 18 is energized. It may be desirable to connect a self-saturating transformer 23 between the secondary winding 22 and the primary winding of the grid transformer 18, or to make the grid transformer 18 of the self-saturating type in order to provide a grid potential of peaked wave form as disclosed and claimed in the co-pending application of B. D. Bedford, filed September 29, 1930, Serial No. 485,335, and assigned to the same assignee as the present application. In order to shift periodically the potential of the circuit including capacitors 16 and 17, the junction between these two capacitors is connected to the common cathode circuit of the valves 14 and 15 through a commutator device 24 and a source of direct current, shown as battery 25, which is preferably shunted by a capacitor 26. The device 24 is provided with conducting segment 27 and cooperating brushes 28 adapted to complete the above-described circuit once each revolution of the commutator. The device 24 is driven preferably by a synchronous motor 29 energized from the alternating current circuit 11. A suitable collar and yoke mechanism 30 is provided for adjusting the phase relation between the commutator 24 and the synchronous motor 29.

In explaining the operation of the above-described apparatus, it will be assumed that it is functioning as a rectifier transmitting energy from the alternating current circuit 11 to the direct current circuit 10. The general principles of operation of a full wave rectifier, such as that illustrated, are well understood by those skilled in the art so that a detailed explanation is not deemed necessary. As stated above, it has not been possible heretofore to commutate the current between the valves 14 and 15 until after the electromotive force of the alternating current circuit is of the proper value to effect such commutation. That is, the current through the valve is commutated slightly after the alternating potential has reversed polarity so that the current is slightly lagging. Furthermore, if the commutation of the current be still further retarded in order to reduce the voltage of the direct current circuit, the alternating current becomes still more lagging with respect to the potential of the alternating current circuit. Assume now that it is desired to transfer current from the valve 14 to the valve 15 while the anode potential of the valve 15 is still below that of the valve 14; that is, against the electromotive force of the transformer 12. The commutator 24 and the phase adjusting mechanism 30 will be so set that the conducting segment 27 will complete a circuit through the brushes 28 at the instant at which it is desired to commutate the current between the valves. The battery 25 is so connected that the full negative potential is impressed upon one side of the capacitors 16 and 17. However, it will be obvious to those skilled in the art that if the valves 14 and 15 are oppositely connected, that is, with a common anode connection, the polarity of the battery 25 should be reversed to impress a positive potential upon capacitors 16 and 17, that is, to shift momentarily their potential in the opposite direction. Due to the fact that it is impossible to change the potential across the capacitors 16 and 17 instantaneously, the anodes of the valves 14 and 15, which are connected to the other side of these capacitors, will also be correspondingly depressed, or shifted below their common cathode potential, thus serving to interrupt the current in the valve 14. By the terms "depressed" or "shifted" is meant that the potential of the capacitors as a whole is changed momentarily with respect to some point in the circuit due to the fact that the capacitors cannot instantaneously change their accumulated charge, that is, their terminal potential. By these terms it is not meant to include the phenomenon of charging and discharging the capacitors, which involves a change in potential across the capacitors. In the meantime, however, the grid potential has reversed polarity so that the valve 14 is non-conducting and the valve 15 is conducting. When the conducting segment 27 passes from beneath the brushes 28, the grid has regained control of the valve 14 to prevent restarting of the current in it and the reactive voltage of the reactor 13 will force the current through the electric valve 15 against the negative voltage of the right-hand portion of the secondary winding of the transformer 12. In a similar manner the current may be commutated from the valve 15 to the valve 14 by depressing the potential of the capacitors 16 and 17 and reversing the polarity of the grid potential of the valves 14 and 15. This cycle is repeated indefinitely with the result that a leading current is drawn from the alternating current circuit 11. As stated above, it has been found desirable to insert the saturating transformer 23 between the source of potential of variable phase and the grid transformer 18 in order to give a peaked wave of grid potential. By properly interconnecting the phase shifting mechanism 30 with the rotary phase shifting transformer 20, these peaks of grid potential may be properly synchronized with the momentary depression of the potential of the capacitors 16 and 17 to effect the desired commutation between the valves. It will be noted that at all times other than during commutation, the grid potentials of both electric valves will be substantially zero because of the peaked wave form of the potential supplied by the saturating transformer 23. Obviously a negative bias battery may be included in the grid circuits if valves having negative critical grid potentials are utilized. By advancing the point in the cycle of alternating potential at which the current is commutated between the valves, the average voltage of the direct current circuit is correspondingly reduced and with it the power factor of the current drawn from the circuit 11.

The operation of the above-described apparatus to transmit current from the direct current circuit 10 to the alternating current circuit 11 is substantially similar. In this case it is possible to delay the commutation of the current between the valves 14 and 15 until after the counter-electromotive force in the circuit associated with the incoming valve has arisen above that of the circuit associated with the outgoing valve.

In Fig. 2 there is illustrated another embodiment of my invention as applied to a polyphase system. Although this invention is applicable to any polyphase system, there is shown by way of example a double three phase power converting apparatus. This apparatus comprises two Y-connected three phase secondary windings 31 and 32 of a power transformer, the primary winding of which has been omitted for the sake of simplicity. The neutral points of the windings 31 and 32 are interconnected through an interphase transformer 33 provided with an electrical midpoint which is connected to one side of the direct current line 10 through a smoothing reactor 13. The several outer terminals of the windings 31 and 32 are connected to the other side of the direct current circuit through electric valves 34 and 39 inclusive. These valves are each provided with an anode, a cathode and a control grid and may be of any of the several types well known in the art, although I prefer to use valves of the vapor electric discharge type. The control grids of the several valves 34 to 39 inclusive are connected to their common cathode circuit through a current-limiting resistor 42 and the several secondary windings 40 with a rotary phase shifting transformer 41, the primary winding of which may be energized from any suitable polyphase alternating current circuit 43, preferably energized from the primary winding of the power transformer. Associated with the transformer windings 31 and 32 are the Y-connected capacitance networks comprising capacitors 44 to 49 inclusive, the neutral points of which are directly interconnected. As will be well understood by those skilled in the art, when this apparatus is operating either as a rectifier or as an inverter, commutation of current between the several valves associated with the winding 31 and the several valves associated with the winding 32 is displaced by substantially 60 electrical degrees. Whenever commutation occurs between a pair of valves associated with one winding, the neutral point of the capacitor network is momentarily depressed and, due to the connection between this point and the neutral point of the other capacitor network, the potential of the other network is simultaneously depressed with the result that current is momentarily interrupted in the conducting valve of the second winding. Forced commutation may be effected at this instant even though normal commutation would not be then possible. For example, assume that the apparatus is operating as a rectifier and that current is just being commutated from valve 34 to valve 35, thus depressing the potential of the neutral point of the capacitor networks and momentarily interrupting the current in all of the valves. Formerly, commutation from the valve 39 to the valve 37 would not take place until 60 degrees later, but if the grid potentials applied to the several valves are advanced by substantially 60 degrees by means of the phase-shifting transformer 41, the valve 39 will be made nonconducting, and the valve 37 conducting so that at the end of the momentary interruption of all the valve currents, the interphase transformer 33 and the smoothing reactor 13 will force the current to start in the valve 37 against the negative potential of the winding 32. Similarly, when the current is commutated from valve 35 to 36, forced commutation may be effected from valve 37 to 38. It will be noted that, with such an arrangement, the advanced forced commutation takes place only in the valves associated with one of the windings so that it would seem that the current delivered by one secondary winding would be leading by substantially 60 degrees, while the current in the other inductive winding would be nearly at unity power factor. However, due to the presence of the interphase transformer 33, which tends to maintain the average current delivered by the windings 31 and 32 equal in magnitude and phase relation, it will be found that the voltage of the interphase transformer 33 will, in some instances, prevent the forced commutation of the valve associated with one winding. The result of this skipping of the forced commutation of a valve associated with one winding is to effect forced commutation of the next valve associated with the other winding and the forced commutation transfers back and forth between the valves associated with the windings 31 and 32 in such a way that the average current delivered by the alternating circuit will lead the potential of the circuit by substantially 30 electrical degrees. Obviously the arrangement illustrated in Fig. 1 for shifting the potential of the neutral point of the capacitor networks at any desired instant in the cycle of alternating potential is equally applicable to the apparatus illustrated in Fig. 2, in which case it will not be necessary to transfer the forced commutation between the valves associated with windings 31 and 32. The forced commutation of all the valves may be effected with any desired angle of phase advance. It will be understood that the arrangement of Fig. 2 also can be operated as an inverter to transfer energy from the direct current circuit 10 to the alternating current circuit connected to the power transformer.

While I have described what I at present consider the preferred embodiments of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is,—

1. Apparatus for transmitting energy between direct and alternating current circuits comprising a plurality of electric valves, an inductive winding interconnecting said circuit through said valves, means for controlling the conductivity of said valves, a commutating capacitor associated with certain of said valves, and means for periodically and momentarily shifting the potential of said capacitor to commutate the load current between successive valves against the electromotive force of the alternating current circuit.

2. Apparatus for transmitting energy between direct and alternating current circuits comprising a plurality of electric valves, an inductive winding interconnecting said circuits through said valves, means for controlling the conductivity of said valves, a commutating capacitor associated with certain of said valves, and means for periodically and momentarily shifting the potential of said capacitor to force commutation of the load current between said valves at points in the cycle of alternating potential when unassisted commutation would not be possible.

3. Apparatus for transmitting energy between direct and alternating current circuits comprising a plurality of electric valves, an inductive winding interconnecting said circuits through said valves, a commutating capacitor associated with certain of said valves, means for periodically and momentarily shifting the potential of said capacitor to interrupt the current in all of said valves, and means for simultaneously rendering non-conductive the valve from which it is desired to transfer current.

4. Apparatus for transmitting energy between direct and alternating current circuits comprising a plurality of electric valves, an inductive winding interconnecting said circuits through said valves, a capacitor network connected between said valves and provided with an electrical neutral means for periodically and momentarily shifting the potential of said neutral to interrupt the current in all of said valves, and means for simultaneously rendering non-conductive the valve from which it is desired to transfer current.

5. Apparatus for transmitting energy between direct and alternating current circuits comprising a pair of electric valves, an inductive winding interconnecting said circuits through said valves, a plurality of capacitors serially connected between said valves, means for periodically and momentarily shifting the potential of an intermediate point of said series capacitor circuit to interrupt the current in both of said valves, and means for simultaneously rendering non-conductive the valve from which it is desired to transfer current.

6. Apparatus for transmitting energy between direct and alternating current circuits comprising a plurality of electric valves, each provided with an electrode connected to a common circuit, and inductive winding interconnecting said direct and alternating current circuits through said valves, a commutating capacitor associated with certain of said valves, a circuit connecting said capacitor to said common electrode circuit and including a source of periodic potential impulses of momentary duration whereby the current in all of said valves is periodically interrupted, and means for rendering non-conductive the valve from which it is desired to transfer current simultaneously with the interruptions of valve current.

7. Apparatus for transmitting energy between direct and alternating current circuits comprising a plurality of electric valves, each provided with an electrode connected to a common circuit, an inductive winding interconnecting said direct and alternating current circuits through said valves, a commutating capacitor associated with certain of said valves, a circuit connecting said capacitor to said common electrode circuit and including a source of direct potential and a commutator device whereby the current in all of said valves is periodically interrupted, and means for rendering non-conductive the valve from which it is desired to transfer current simultaneously with the interruptions of valve currents.

8. Apparatus for transmitting energy between direct and alternating current circuits comprising a plurality of electric valves, each provided with an electrode connected to a common circuit, an inductive winding interconnecting said direct and alternating current circuits through said valves, a commutating capacitor associated with certain of said valves, a circuit connecting said capacitor to said common electrode circuit and including a source of direct potential and a commutator device synchronized with the potential of said alternating current circuit, means for adjusting the phase relation of said commutator whereby the current in all of said valves is periodically interrupted at any desired point in the cycle of alternating potential, and means for rendering non-conductive the valve from which it is desired to transfer current simultaneously with the interruptions of valve currents.

9. Apparatus for transmitting energy between direct and alternating current circuits comprising a plurality of electric valves, each provided with a control electrode and a second electrode connected to a common circuit, an inductive winding interconnecting said direct and alternating current circuits through said valves, a commutating capacitor associated with certain of said valves, a circuit connecting said capacitor to said common electrode circuit and including a source of direct potential and a commutator device synchronized with the potential of said alternating current circuits, means for adjusting the phase relation of said commutator whereby the current in all of said valves is periodically interrupted at any desired point in the cycle of alternating potential, means for exciting said control electrodes with a potential in synchronism with the potential of said alternating current circuit, and means for adjusting the phase relation of said control potential to correspond with the phase adjustments of said commutator.

10. Apparatus for transmitting energy between direct and alternating current circuits comprising a plurality of electric valves provided with a common cathode connection, an inductive winding interconnecting said circuits through said valves, means for controlling the conductivity of said valves, a commutating capacitor connected between the anodes of certain of said valves, and a circuit connecting said capacitor and said cathode connection and including means for periodically and momentarily depressing the potential of said capacitor to commutate the load current between successive valves against the electromotive force of the alternating current circuit.

11. The combination of direct and alternating current circuits, apparatus for transmitting energy therebetween at any desired power factor comprising a plurality of electric valves, an inductive winding interconnecting said circuits through said valves, means for controlling the conductivity of said valves, a commutating capacitor associated with certain of said valves, and means for periodically and momentarily shifting the potential of said capacitor to commutate the load current between successive valves against the electromotive force of the alternating current circuit.

12. Apparatus for transmitting energy between direct and polyphase alternating current circuits, a plurality of electric valves, two similar polyphase inductive windings having a phase displacement between corresponding windings and interconnecting said circuits through said valves, means for controlling the conductivity of said valves, a capacity network associated with each of said polyphase windings, and a connection between said capacity networks by means of which the commutation of current between the valves associated with one winding interrupts the current in all the valves to permit the commutation of the current of the other winding between successive valves against the electromotive force of the alternating current circuit.

13. Apparatus for transmitting energy between direct and polyphase alternating current circuits, a plurality of electric valves, two similar polyphase inductive windings having a phase displacement between corresponding windings and interconnecting said circuits through said valves, means for controlling the conductivity of said valves, a capacity network for each polyphase winding and connected between the anodes of the valves associated therewith, each of said networks being provided with an electrical neutral and a connection between the neutral points of said networks for interrupting the current in all the valves upon the commutation of current between the valves associated with one winding to permit the commutation of the current of the other winding between successive valves against the electromotive force of the alternating current circuit.

14. The method of transmitting energy between direct and alternating current circuits at any desired power factor by means of an apparatus including a pair of electric valves and a commutating capacitor connected therebetween which comprises periodically rendering said valves alternately conductive and nonconductive and momentarily shifting the potential of said capacitor to transfer the load current between successive valves against the electromotive force of the alternating current circuit.

15. The method of transmitting energy between direct and alternating current circuits by means including a pair of electric valves and a commutating capacitor connected therebetween which comprises periodically rendering said valves alternately conductive and nonconductive and momentarily shifting the potential of said capacitor to force commutation of the load current between said valves at points in the cycle of alternating potential when unassisted commutation would not be possible.

16. The method of transmitting energy from an alternating current supply circuit to a direct current load circuit at any desired power factor by means of an apparatus including a pair of electric valves and a commutating means connected therebetween which comprises periodically rendering said valves alternately conductive and nonconductive and controlling the average electrostatic potential of said commutating means with respect to the rest of said apparatus in such a manner as to transfer the load current between successive valves against the electromotive force of the alternating current circuit.

17. The method of transmitting energy between direct and alternating current circuits at any desired power factor by means of an apparatus including a pair of electric valves and a commutating capacitor connected therebetween which comprises momentarily shifting the potential of said capacitor to interrupt the current in said valves and simultaneously rendering non-conductive the valve from which it is desired to transfer current.

FRANCIS B. VOGDES.